Dec. 17, 1957     J. K. MERTZWEILER     2,816,933
CATALYST REGENERATION IN OXO ALCOHOL SYNTHESIS
Filed Feb. 9, 1952
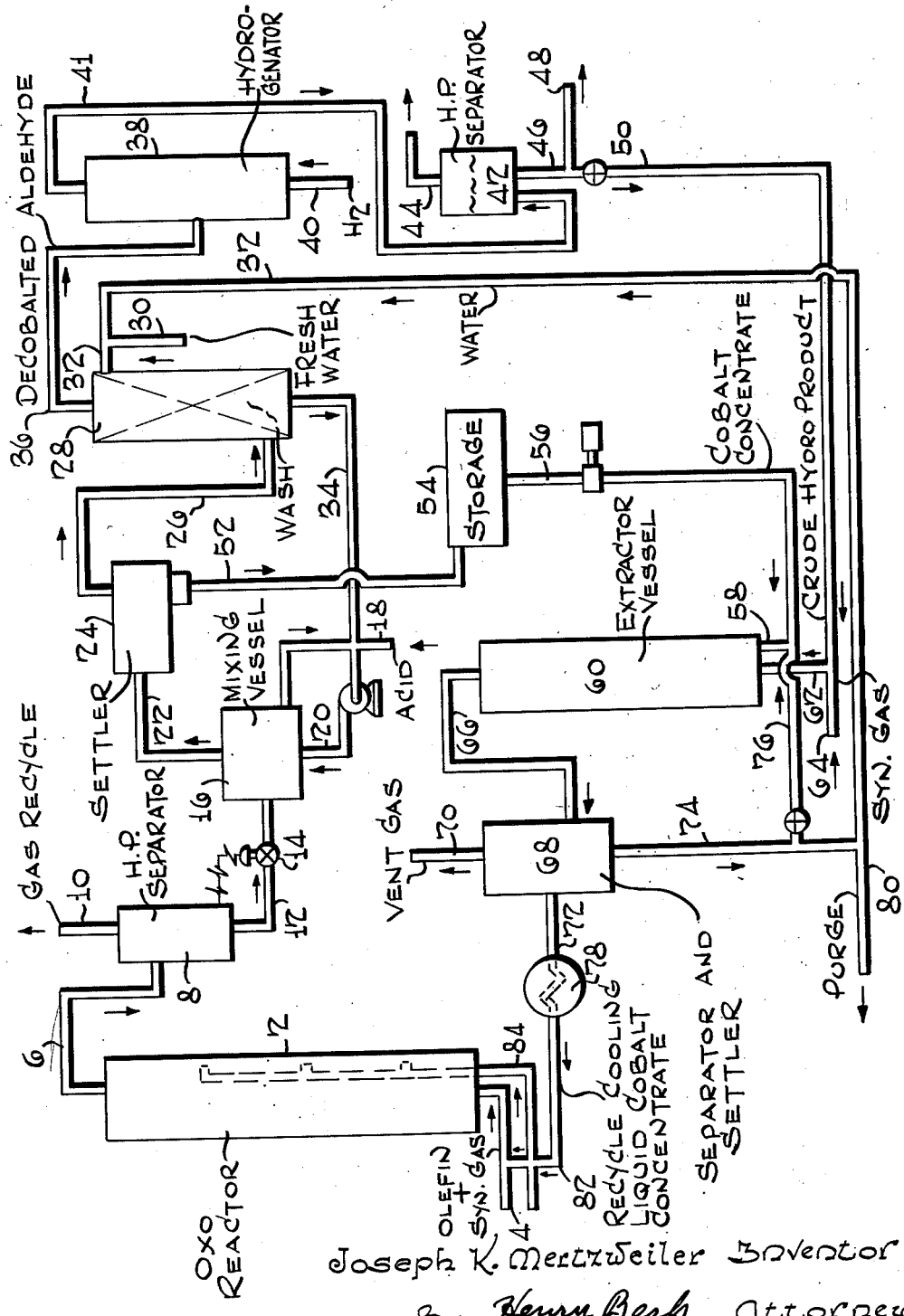
Joseph K. Mertzweiler Inventor
By Henry Berk Attorney United States Patent Office 2,816,933
Patented Dec. 17, 1957

2,816,933
CATALYST REGENERATION IN OXO ALCOHOL SYNTHESIS

Joseph K. Mertzweiller, Baton Rouge, La., assignor to Esso Research and Engineering Company, a corporation of Delaware Application February 9, 1952, Serial No. 270,835

5 Claims. (Cl. 260—638)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins such as propylene, butylene, pentene, hexene, heptene, butadiene, pentadiene, styrene, olefin polymers such as di- and tri-isobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalyst in the first stage of the prior art processes is usually added in the form of salts of the catalytically active metal with high molecular fatty acids, such as stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise it would separate out on the hydrogenation catalyst, plug transfer lines and heat exchangers, etc. The carbonyl remains dissolved in the reaction product from the primary carbonylation stage and is therefore removed in the catalyst removal, or decobalting zone.

A good way to remove the cobalt is by a thermal method wherein the accrued product in the first stage is heated to a temperature of from about 300–350° F. Conveniently, a steam coil immersed in the liquid to be decobalted is employed. A pressure of from about 100–175 p. s. i. g. is maintained in the decobalting zone by the injection of a gasiform material, such as hydrogen, an inert vapor, etc., whereby the CO partial pressure is maintained at a relatively low value in the decobalting zone. Periodically, it is necessary to take the decobalter off stream to remove accumulated metallic cobalt to prevent plugging of feed lines and adjacent areas of the decobalting vessel. Furthermore, cobalt metal deposits as a film on the heating means and requires constant removal to prevent plugging of the pretreating equipment and surfaces. The removal of these films and deposited cobalt metal is a tedious and difficult process and adds significant cost to the economics of the carbonylation reaction. Furthermore, thermal decobalting usually did not completely remove soluble cobalt from the aldehyde product.

These difficulties were to a great extent removed, and a long step forward was taken, when it was found that when the aldehyde product comprising the reactor effluent from the carbonylation zone was treated with dilute aqueous solutions of organic acids whose cobalt salts are water soluble and oil insoluble, exceptionally efficient decobalting was obtained, with residual cobalt content of the aldehyde product less than 10 parts per million. The thermal decobalting process frequently left a feed for the subsequent hydrogenation process containing from 100–500 parts per million of dissolved cobalt. This resulted from the fact that though cobalt carbonyl is readily decomposed at the thermal conditions, other compounds of cobalt, such as cobalt soaps and salts, are quite stable at these temperatures. Cobalt salts such as cobalt formate in the aldehyde product originate from the formation of secondary reaction products, such as formic and higher fatty acids in the course of the reaction and from the fatty acid cobalt soaps originally added as catalyst.

An important advantage of acid decobalting, besides the fact that lower temperatures are required than in thermal decobalting, is that cobalt recovery is considerably simplified and made more feasible. Because of the strategic importance of this metal, it is essential for an economically feasible process that substantially all the metal be recovered and reutilized. This, instead of precipitating the metal as a solid on packing, tubes, reactor walls, etc., as in the prior art processes, the effect of dilute aqueous organic acid injection is to convert substantially all the cobalt dissolved in the aldehyde product, regardless in what form it is present, into a water-soluble salt, and this aqueous stream is readily separated from the decobalted aldehyde product.

The utilization of this aqueous cobalt stream, which may have a cobalt concentration of 0.5 to 10%, poses several problems. The most direct method of utilization consists of recycling directly the aqueous stream to the primary aldehyde synthesis zone. This step, however, may be undesirable, in that it introduces considerable quantities of water into the reactor oven, and may result in oven flooding and loss of reaction. Under certain circumstances, a limited amount of water in the primary reactor is desirable, but under other circumstances, it may not be so. Flooding is particularly liable to occur if the cobalt solutions recovered are relatively dilute.

As an alternate process, the aqueous cobalt solution may be converted to oil-soluble forms of cobalt, such as cobalt oleate, by a thermal treatment with oleic acid, involving concentration of the aqueous solution and volatilizing the low molecular weight organic acid. Such process is time-consuming, expensive, and not very efficient. Still another process involves neutralizing the aqueous solution to precipitate the hydroxide, suspending the latter in an organic liquid, such as aldehyde product or olefin, and recycling this to the reaction zone. This avoids addition of water to the latter, but involves pumping of suspended solids, with accompanying pump erosion problems.

It is one of the purposes of the present invention to provide an improved and novel means for removing and recovering dissolved carbonylation catalyst from conversion products resulting from the reaction of olefinic compounds with CO and $H_2$ and efficiently reutilizing the recovered catalyst in the reaction.

It is also a purpose of the present invention to set forth a process of achieving the advantages of recycling the catalyst in oil-soluble form whereby the disadvantages of introducing water into the carbonylation reactor are eliminated.

Other and further objects and advantages of the invention will become apparent from the more detailed description hereinafter.

In accordance with the present invention, the aqueous cobalt-containing solution resulting from the organic acid decobalting process is contacted with the crude hydrogenated aldehyde, i. e., crude alcohol product resulting from a later stage of the process, at elevated temperatures and pressures and in the presence of synthesis gas, that is, a mixture of $H_2$ and CO in preferably about equimolar ratio. There results, irrespective of how dilute the solution of cobalt in water, a partitioning of the metal between the aqueous and the organic liquid layers. The organic layer, after passing through a gas-liquid separator, may be cooled, and is then recycled to the carbonylation reactor, preferably being injected at a number of different zones. The recycling thus simultneously provides catalyst and also a cooling medium for the highly exothermic Oxo reaction.

The aqueous layer, partially depleted of its cobalt content, is recycled to the extraction vessel until it becomes sufficiently depleted in cobalt; then it may be recycled to the acid decobalting stage. A portion may be purged from the system to prevent undesirable build-up of impurities.

The use of the crude hydrogenated product for the extraction of the cobalt is unique; other product streams from the various stages are not satisfactory. Thus the pure olefin feed is not suitable for the present process for use as solvent, because premature aldehyde synthesis would accur, involving problems in temperature control. Under certain conditions it may be desirable to include a small amount of olefin, 10–20% of total, to obtain the advantage of some carbonylation reaction without a serious temperature control problem. The decobalted aldehyde product has been found to give but poor conversion of low molecular water soluble cobalt salts, which may be due to the presence of hydrolyzable formates and formic esters. The use of "bottoms" product from the final alcohol distillation stage also has been found to result in very poor conversion of these cobalt salts to oil-soluble cobalt compounds, when treated by the present process. The finished alcohol product is equivalent to the crude hydrogenated aldehyde product for this process, but recycle thereof would, of course, be economically undesirable.

The exact nature of the oil-soluble forms of cobalt resulting from this process is not completely understood but there is considerable evidence that the predominant form is cobalt carbonyl hydride. Since this compound is generally considered to be the true carbonylation catalyst, the advantages offered by this type of recycle process are significant.

The present invention will best be understood from the more detailed description hereinafter, wherein reference will be made to the accompanying drawing, which is a schematic representation of a system suitable for carrying out a preferred embodiment of the invention.

Turning now to the figure, olefin feed and synthesis gas are passed, after preheating in a fired coil (not shown), through feed line 4 to the bottom portion of primary reactor 2. The latter comprises a reaction vessel which may, if desired, be packed with non-catalytic material, such as Raschig rings, pumice and the like, and may be divided into discrete packed zones.

Though catalyst is provided for the process in a manner more fully disclosed below, initially catalyst may be supplied as an oil-soluble cobalt soap, such as cobalt oleate or naphthenate and the like. A convenient method of introducing catalyst may be as a solution in the olefin feed, though also it may be introduced separately into reactor 2. It is added in amounts equivalent to about 0.1–0.5% of cobalt on olefin.

Synthesis gas comprising approximately equal parts of $H_2$ and CO is likewise introduced and flows concurrently or countercurrently with the olefin feed. Reactor 2 is preferably operated at a pressure of about 2500–3500 p. s. i. g. and at a temperature of about 200–450° F. depending upon the nature of the olefin feed and other reaction conditions.

Liquid oxygenated reaction products comprising mainly aldehydes having one more carbon atom than the olefin feed, and containing catalyst in solution and unreacted synthesis gas are withdrawn overhead from reactor 2 and transferred through line 6, with intermediate cooling, if desired, and passed to high pressure separator 8, where unreacted gases are withdrawn overhead through line 10 and preferably at least in part recycled.

A stream of primary reaction product containing dissolved therein relatively large amounts of cobalt carbonyl and other forms of cobalt is withdrawn from separator 8 through line 12 and pressure release valve 14 and the degassed aldehyde product is passed to mixer 16. This unit is of any conventional design, and is adapted to mix thoroughly an aqueous and a water-insoluble liquid organic phase. An organic acid solution whose cobalt salts are water-soluble is injected through lines 18 and 20. Suitable acids are acetic, formic, and the like. Acetic acid is preferred, for its cobalt salts have greater water solubility, thus requiring less water for their complete recovery. Acid is added in amounts sufficient at least to combine with all cobalt present, and the water dilution is adequate at least to dissolve all cobalt salts formed. Thus, a satisfactory operation may be had employing about 10% (based on aldehyde) of a 5% aqueous solution of acetic acid. For less water soluble cobalt salts, a greater amount of water is required.

The temperature level within mixer 16 must not exceed about 200° F., and is preferably about 150–185° F., to prevent thermal decomposition of cobalt carbonyl into the metal.

After sufficient mixing and recirculation, on the order of 30–120 minutes, the mixture is pumped through line 22 to settler 24, where the aqueous and aldehyde layers are allowed to stratify. Substantially all of the cobalt is in the lower aqueous layer. The aldehyde layer may then be passed to water washing equipment 28 via line 26, where hot water at about 165° F. may be injected through lines 30 and 32 to wash out the last traces of cobalt acetate. As will be made more clear below, water from the extraction system may also in part be passed via line 32 to this zone. About 10% wash water on aldehyde may be employed, and the wash water, withdrawn through line 34 and containing small amounts of cobalt, may be recycled to the mixer 16 as diluent for the acid stream.

Overhead from washing equipment 28, there is withdrawn through line 36 the substantially completely decobalted aldehyde product, and the aldehyde product may then be passed to hydrogenation oven 38. Hydrogen is supplied through line 40 in proportion sufficient to convert the organic compounds to alcohols. Any conventional hydrogenation catalysts, such as nickel, copper chromite, tungsten or molybdenum sulfide, etc., either supported or unsupported, may be employed. Pressures ranging from 1500–4500 p. s. i. g. and temperatures from 300 to 550° F. may be used.

The products of the hydrogenation reactor are withdrawn overhead through line 41 and passed to high pressure gas-liquid separator 42, where unreacted hydrogen may be withdrawn through line 44. The crude liquid product is withdrawn through line 46, and the bulk is passed via line 48 to the alcohol finishing system. A portion, however, in accordance with the present invention, is passed to the cobalt extraction system as below.

Returning now to settler 24, the lower aqueous layer containing in solution the recovered cobalt salt, is withdrawn through line 52 and may be passed to storage 54. When sufficient cobalt solution has accumulated, the aqueous solution is pumped via lines 56 and 58 to extraction vessel 60. This vessel is of conventional design and built to withstand high pressure. A portion of the crude hydrogenation product is passed into vessel 60 via lines 50 and 62, and concurrently, synthesis gas at high pressure, i. e., preferably at pressures similar to those obtaining in reactor 2, is passed into vessel 60 through lines 64 and 62. Conditions within extractor vessel 60 may include temperatures of from about 175 to 400° F., pressures of from 500 to 4500 p. s. i. g., preferably 225 to 350° F. and 1500 to 3500 p. s. i. g. The ratio of crude hydro product to water solution may be in the range of 0.5 to 10 volumes organic solvent per volume aqueous solution. Intimate mixing may be obtained by using packed towers and the like. As a result of the interaction of the reactants, a substantial proportion of the water-dissolved cobalt salt is converted into oil soluble form and passes into the crude alcohol layer as a result of partitioning.

The mixture is withdrawn from the upper portion of vessel 60 and is passed via line 66 to unit 68, wherein both separation of gas from liquid, and separation of an upper alcohol layer and a lower aqueous layer is achieved. The lower layer, now partially depleted in cobalt, may be recycled to extractor 60 via lines 74 and 76; when this material becomes sufficiently depleted so that further extraction is no longer economically feasible, the liquid may be recycled in part through lines 74 and 32 to the wash unit 28. A portion is desirably purged through line 80 to avoid build-up of impurities.

The upper layer in settler 68 is withdrawn through line 72 and may, if desired, be cooled to about 50 to 100° F. in cooler 78. The cooled product is then passed via lines 82 and 84 into reactor 2 to supply simultaneously at least a portion of the catalyst requirements for the aldehyde synthesis process, and also cooling for the highly exothermic reaction. The catalyst solution is advantageously injected into a plurality of zones within 2 to provide uniform catalyst supply and uniform cooling.

The invention admits of numerous modifications apparent to those skilled in the art. Thus, though there has been illustrated an embodiment wherein the extraction process is a single stage, upflow concurrent system, it should be understood that more efficient extraction means, e. g., multistage counter current systems may be employed.

The invention may be further illustrated by the following specific examples.

*Example I*

The purpose of this experiment was to obtain some background as to the nature of the oil-soluble forms of cobalt obtained by extraction with crude hydrogenated product.

The aqueous cobalt solution used in this test was obtained by decobalting iso-octyl aldehyde with an aqueous solution of acetic acid at 160–175° F. Its composition was as follows:

Sp. gravity (60° F.) _____ 1.065.
Acidity, wt. percent as acetic acid__ 1.18.
Total cobalt, wt. percent_____ 3.12.
Cobalt as Co(CO)$_4^-$ anion_____ 1.06 (34% of total).

A volume of 150 ml. of this aqueous solution was placed in a nitrogen atmosphere in a 500 ml. graduated cylinder and 150 ml. of crude iso-octyl alcohol (hydro-product) was added. The mixture was agitated at 78° F. by means of a steady stream of nitrogen passed through a fritted glass thimble for 30 minutes. The layers were allowed to separate in the presence of air. The hydro product layer, which was initially very light yellow in color showed the presence of a black zone at the air interface. A sharp interface existed between the lower portion of the black zone and the remainder of the hydro product. This interface gradually moved down toward the aqueous layer and after standing 24 hours the upper 60% of the hydro product layer was very dark. This is a direct indication that the material extracted into the organic phase was principally cobalt hydrocarbonyl (colorless or light yellow in pure form) which was oxidized to cobalt carbonyl (dark orange or red) on contact with air. By analysis the aqueous layer contained 3.03% cobalt indicating that some 0.09% was extracted by the hydro product.

Although the concentration of cobalt attained in the solvent under these conditions was impractically low, this is considered to illustrate the fundamentals of the process. More practical cobalt concentrations 1.5–2% are obtained by employing higher temperatures and higher hydrogen and carbon monoxide partial pressures.

*Example II*

The following series of autoclave tests illustrate the use of aqueous cobalt solutions obtained from an (acetic) acid decobalting system in connection with the production of iso-octyl alcohol in a semi-commercial plant. A portion of these runs illustrates the effect of continued recycle of the aqueous phase to the extraction system. All the following tests were for 6 hours duration.

| Solvent | Finished alcohol | | 1st cycle | 2nd cycle | 3rd cycle |
|---|---|---|---|---|---|
| | | | Crude hydro product | | |
| Solvent/feed, vol. ratio | 1/1 | | 3.3/1 | 1/1 | 1/1 |
| Temp., °F | 225–240 | | 220–230 | 225 | 215–235 |
| Syn. gas press., p. s. i. g. | 2,925 | | 2,500 | 2,700 | 2,775 |
| | Feed | | Feed | | |
| Cobalt distribution, wt. percent of charge: | | | | | |
| In solvent | | 54 | 53 | 53 | 41 |
| In water as Co++ | 67 | 14 | 69 | 16 | 15 |
| In water as Co(CO)₄⁻ | 33 | 25 | 31 | 19 | 39 | 58 |
| In solvent (cumulative) | | | | 53 | 78 | 87 |
| Total cobalt in solvent, wt. percent | | 1.47 | | 1.95 | 2.22 | 0.78 |

Example III

In Example III below, there is illustrated the properties of the various solvent streams in the aldehyde-alcohol synthesis reaction, and their adaptability for the purposes of the present invention. The runs were autoclave tests in which aqueous solutions of cobalt acetate and solvents were contacted at elevated temperatures and synthesis gas pressures:

[Feed: Aqueous solution of cobaltous acetate (3.4% cobalt) plus 1% free acetic acid—all tests for 6 hrs. duration.

| Run No | A | B | C | D | E | F | G | H |
|---|---|---|---|---|---|---|---|---|
| Solvent | Oxo aldehyde | | Fract. bottoms | | Crude hydro product | | Finished alcohol | |
| Solvent/feed, vol. ratio | 1/1 | 1/1 | 3.3/1 | 1/1 | 1/1 | 5/1 | 1/1 | 3.3/1 |
| Temp. °F | 225–230 | 350 | 225 | 220–225 | 225–235 | 220–225 | 225–230 | 225–230 |
| Syn. gas press., p. s. i. g. | 3,000 | 3,200 | 3,100 | 2,900 | 2,925 | 2,725 | 2,900 | 3,100 |
| Cobalt distribution, wt. percent of charge: | | | | | | | | 11. |
| In solvent | 6 | 41 | <1 | <1 | 45 | 62 | 52 | 72 |
| In water as Co++ | 45 | 25 | 99 | 99 | 16 | 17 | 15 | 12 |
| In water as Co(CO)₄⁻ | 44 | 28 | Trace | Trace | 28 | 22 | 21 | |
| Total cobalt in solvent, wt. percent | 0.27 | 1.55 | 0.006 | 0.018 | 1.86 | 0.55 | 1.94 | 0.88 |

From these data, it is apparent that oxo aldehydes or fractionator bottoms (i. e., product remaining after the desired alcohol has been recovered) are entirely unsuitable as solvent medium for converting cobalt acetate into an oil-soluble form. This may be due to the presence of hydrolyzable formates in these media. On the other hand, the alcohol product is an eminently suitable solvent medium for this purpose.

The present application is a continuation-in-part of Serial No. 245,599, filed September 7, 1951, now U. S. Patent No. 2,767,048.

What is claimed is:

1. An improved integrated process for preparing alcohols from olefins having at least three carbon atoms which comprises passing olefins, CO, H₂ and a cobalt carbonylation catalyst in the absence of extraneous water to a carbonylation zone, maintaining elevated temperatures and pressures in said zone, withdrawing a cobalt-contaminated aldehyde product from said zone, transferring said product to a decobalting zone, contacting said product in said zone at a temperature not above about 200° F. with an aqueous solution of an organic acid, whose cobalt salts are water-soluble, converting cobalt dissolved in aldehyde product into a water-soluble cobalt salt of said organic acid, withdrawing cobalt-depleted aldehyde product from said zone, hydrogenating said aldehyde product to an alcohol product, withdrawing a cobalt-comprising aqueous solution from said decobalting zone, contacting said aqueous solution with a portion of said alcohol product in the presence of CO and H₂ at elevated pressures in an extraction zone thereby converting said water-soluble cobalt into alcohol-soluble cobalt hydrocarbonyl, and passing the resulting reaction mixture to a separation zone wherein an aqueous phase partially depleted in cobalt ions separates from an alcoholic phase containing cobalt hydrocarbonyl, recycling said aqueous phase to said extraction zone until sufficiently depleted in cobalt ions and then recycling it to said decobalting zone, and recycling said alcoholic phase to said carbonylation zone thereby avoiding the addition of extraneous water to said carbonylation zone.

2. The process of claim 1 wherein said presures in said extraction zone are from 1500–3500 p. s. i. g.

3. The process of claim 1 wherein said hydrocarbonyl-containing alcohol product is injected at a plurality of injection points in the direction of flow of reactants and products in said carbonylation zone to provide uniform cooling and active catalyst throughout said zone.

4. The process of claim 1 wherein the volume ratio of alcohol product to aqueous solution in said extraction zone is in the range of about 0.5–10/1.

5. The process of claim 1 wherein said cobalt-containing alcohol product, prior to passing to said carbonylation zone is cooled to 50–100° F.

References Cited in the file of this patent

UNITED STATES PATENTS

| | | |
|---|---|---|
| 2,476,263 | McKeever | July 12, 1949 |
| 2,557,701 | Smith | June 19, 1951 |
| 2,547,178 | Spence | Apr. 3, 1951 |
| 2,576,113 | Hagemeyer | Nov. 27, 1951 |
| 2,640,074 | Gresham et al. | May 26, 1953 |
| 2,646,394 | Green et al. | July 21, 1953 |
| 2,647,149 | Condit et al. | July 28, 1953 |
| 2,701,816 | Buchner et al. | Feb. 8, 1955 |

OTHER REFERENCES

Meyer Translation: Oxo Process, PC–S–V, Chas. A. Meyer & Co., N. Y. (Deposited in Lib. of Congr. March 12, 1946; Ruhrchemie Aktiengesellschaft pat. application R 655, filed January 9, 1943, pages 12 and 13, I. G. F. Patent appl. O. Z. 13,948, filed June 16, 1942, pp. 40 and 41.

I. G. Farbenindustrie pat. appl. O. Z. 13705, T. O. M. Reel 36 (available in English translation in Oxo Process, Chas. A. Meyer translation PC–S–V, pp. 62–63), deposited in Libr. of Congress March 12, 1946.

Wender et al.; J. Amer. Chem. Soc., vol. 72, pp. 4375–4378, October 1950.